April 17, 1951  W. L. CLAYTON  2,549,171
BEARING COOLING DEVICE
Filed April 17, 1947
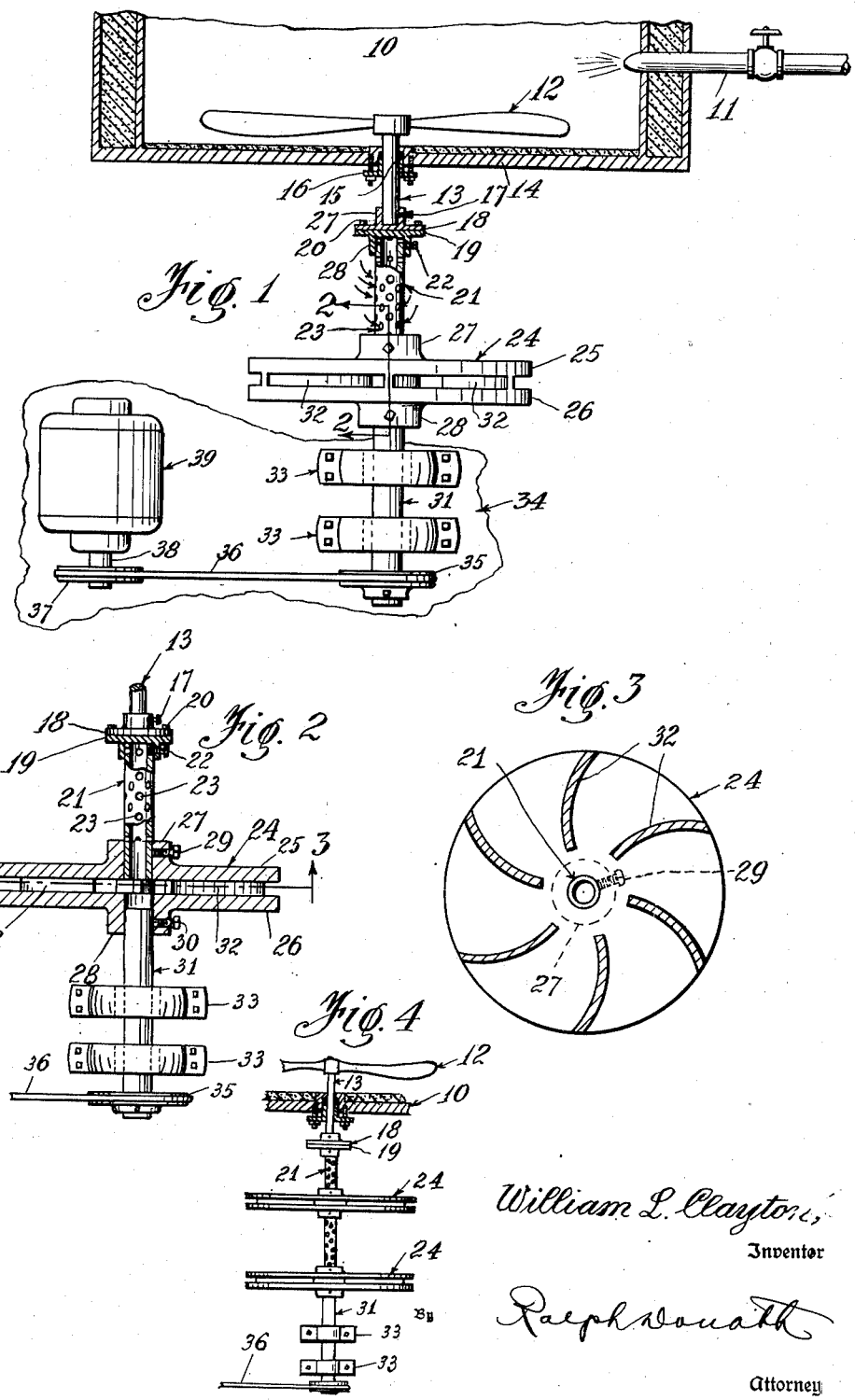
William L. Clayton,
Inventor
Ralph Donath
Attorney Patented Apr. 17, 1951

2,549,171

UNITED STATES PATENT OFFICE 2,549,171

BEARING COOLING DEVICE

William L. Clayton, Harmony, Pa.

Application April 17, 1947, Serial No. 742,189

1 Claim. (Cl. 308—77)

This invention pertains to shaft and bearing cooling devices used in industrial heat treating devices such as annealing and heating furnaces, kilns and similar apparatuses in which a fan is rotated within by a shaft operatively connected to an outside drive.

The methods of and apparatuses used heretofore for such purposes had the disadvantage that, due to the high temperatures inside the heat treating devices, the driving shaft of the fan conducted so much heat to the driving mechanism, especially to the shaft supporting bearings, that they were subjected to excessive wear, failure of lubrication and consequently an early breakdown.

To alleviate this disadvantage it was proposed to make the driving shaft of the fan hollow and to employ blades thereon to cause a flow of the atmospheric air partially through the shaft and partially outside of the shaft toward the heating device, these devices however, though diminishing somewhat the heat transmitted to the drive by the shaft, would not eliminate enough heat to obviate the troubles aforementioned.

My invention eliminates entirely these and other disadvantages by providing suitable means to transmit to the atmosphere all harmful heat conducted by the driving shaft of the fan from the heat treating device before the heat can reach that part of the drive which is supported in the bearings. I achieve this result by employing a fan driving shaft leading from the inside of the heat treating device to the outside drive in several units, two of which at least are separated by an air gap that is bridged over by a coupling operating as a heat trap, which prevents the heat to travel from one shaft unit to the adjacent one. This heat trap operates on the principle that heat always flows from the place of higher temperature to that of lower temperature and never oppositely.

The invented structure causes the heat to flow to the low temperature peripheral portion of the coupling, from where it is transmitted to the atmosphere and cannot travel past the coupling to the abutting shaft unit. The effect of this heat trap is analogous to a water trap which is connected to the sea level; hence the water will always flow from the higher level into the trap and from there into the sea and never in opposite direction.

Hence, one object of the present invention is to provide a heat protected drive which will prevent the flow of heat from one shaft unit to an operatively connected abutting shaft unit by rigidly connecting them with a coupling comprising disks of relatively substantial mass integral with relatively thin vanes supporting this abutting shaft unit by bearings and operatively connecting it to a prime mover for rotary motion.

Another object of the invention is to provide a drive of the character described having shaft units divided by an air gap and attached by a rigid coupling composed of two disks and of relatively thin connecting blades of relatively large dimensions in comparison to the diameter of the shaft, whereby the rotary speed of the periphery of the coupling becomes several times greater than that of its hub portion.

A further object of the invention is to provide a heat protected drive employing a coupling between abutting shaft units which coupling acts as an impeller drawing the air through a hollow shaft portion ejecting it radially through the impact with the connecting blades of the coupling.

Still another object of the invention is to provide a drive shaft composed of three units, the first reaching into a heat treating apparatus and being solid or otherwise impassable to the heated gases of the atmosphere within the heat treating chamber, the second shaft unit, being rigidly connected to the first, being hollow and provided with a plurality of openings to the outside atmosphere and having fastened to the end thereof the hub portion of a rigid coupling, the second hub portion of which being rigidly connected to a third shaft unit supported in bearings and operatively connected to rotating drive means.

Another object of the invention is to provide a heat protected drive consisting of shaft units separated by an air gap bridged over by a rigid coupling, consisting of disks and connecting vanes which are cooled by an air flow caused by the rotation of said shafting.

Yet another object of the invention is to provide a heat protected drive shaft, the separate units of which are connected by a coupling constructed as a centrifugal impeller, the blades of which are suitably curved for causing suction from its central part toward its periphery during its rotation.

These and other objects of the invention will be evident to those versed in the art when reading the following specification in connection with the accompanying drawing in which:

Figure 1 is a semi-diagrammatic representation of a portion of a heat treating furnace in elevational cross-section in which a fan is rotated by a shaft connected to a vertical outside drive, shown in elevational view.

Figure 2 is a cross-sectional view on line 2—2 in Figure 1.

Figure 3 is a cross-sectional view on line 3—3 in Figure 2.

Figure 4 shows a second embodiment of the invention in which a second impeller is interposed between the first and second shaft units, shown in cross-sectional view.

Similar parts are denoted by similar characters throughout the several views of the drawing.

Referring now to the drawing by the characters of reference the heat treating device shown in Figure 1 represents an annealing furnace, generally designated by the numeral 10 into which fuel and air are introduced to the interior of the furnace by a nozzle 11 for combustion. For uniform heat treating of the material (not shown) in the furnace the combustion gases are stirred by a fan 12, which is fixed to a rotary shaft unit 13, preferably of heat resisting material.

Shaft unit 13 traverses the wall 14 of furnace 10 through a suitable aperture 15 which has sufficient clearance for frictionless rotation therein of shaft unit 13. A suitable stuffing box gland 16 of any approved type prevents the leaking out of the hot gases from the furnace. Shaft unit 13 is preferably solid or has closed ends thereby preventing the passage of hot gases or air through the shaft.

Shaft unit 13 is rigidly connected by conventional means such as a set-screw 17 to coupling half 18 to which a corresponding coupling half 19 is fixed by suitable means such as bolts 20, or otherwise. To coupling half 19 is rigidly attached a hollow shaft unit 21 by means of a set-screw 22. A plurality of holes 23 are provided in the hollow shaft unit 21 through which holes air can freely pass from the atmosphere into the hollow shaft portion.

At the other end of the hollow shaft unit 21, which is away from the furnace 10, is fixed the heat trapping coupling generally designated by the numeral 24. This coupling consists of two disks 25 and 26, the mass of which is substantial, each being greater than that of the shaft unit 21 and the radial diameter of which is also substantial, several times that of the outside diameter of shaft unit 21.

Disks 25 and 26 have a hub portion 27 and 28 respectively. Hub portion 27 is fixed rigidly by a set-screw 29 to hollow shaft unit 21 while hub portion 28 of disk 26 is fixed in a similar way by a set-screw 30 to the third shaft unit 31.

Between disks 25 and 26 are vanes 32, shown to be curved impeller blades, suitable to draw air from the central portion and to draw it peripherally, when rotating.

Shaft unit 31 is supported by bearings 33 secured in any approved manner to a stationary support 34. Driving means such as, for instance, a pulley 35 is fixed to the shaft unit 31 and operatively connected by means of a belt 36 to the driving pulley 37 fastened to the shaft 38 of a prime mover 39, shown to be an electric motor.

While for the sake of simplicity of the drawing I have shown only a single drive for a single fan inside of the furnace, it is obvious that a plurality of drives may be arranged driven by one or more prime movers rotating a plurality of fans.

The device operates as follows:

Motor 39 rotates pulleys 35 and 37 by means of the belt 36 thereby rotating the shaft unit 31 supported in bearings 33, and together with it also the heat trapping coupling 24, the shaft unit 21, shaft unit 13 and the fan 12. From the furnace 10 heat will be conducted by shaft unit 13 to coupling halves 18 and 19 from which the heat will proceed through the hollow shaft unit 21 to hub 27 of disk 25. Simultaneously impeller vanes 32 set up a rapid flow of air through the hollow shaft unit 21. As indicated by the arrows, the atmospheric air enters through holes 23 and flows axially toward the vanes 32 after which it is expelled radially by them due to the suction and compression respectively, that the vanes 32 create.

It is to be noted that all the sucked-in air moves axially within the hollow shaft in a direction away from the furnace and is expelled radially by the vanes 32 between the disks 25 and 26 of the coupling 24.

This air stream takes by conduction and convection part of the heat flowing in hollow shaft unit 21 while part of it will travel toward hub 27 of the disk 25 heating the hub section first, then progressing toward the periphery of the disk 25. The outside surface of disk 25 is in contact with the atmosphere and is effectively cooled thereby, by conduction and convection.

The cooling effect increases from the hub portion toward the periphery because the rotary speed of the disk particles increase from the hub portion toward the periphery and with it is increased the relative speed difference between the atmospheric air particles and contacted disk particles, hence, also the amount of heat given from the disk particles to the atmosphere. In other words, the temperature of the disk particles will decrease from the hub toward the periphery. Another cause for the temperature drop toward the periphery of the disk is that the mass and the surface of the disk in every circular cross-section increases from the hub toward the periphery.

As a consequence, at suitable rotary speeds of the disk 25 its peripheral portion will have a considerably lower temperature than its hub portion 27, hence, the heat conducted by the shaft unit 21 will constantly and quickly travel from the hub portion 27 toward the place of the lowest temperature, which is the peripheral portion of the disk 25.

The vanes 32 are effectively cooled by the air stream they produce and which they contact on both sides of their impeller surfaces. Very little heat will be transmitted to disk 26 by the produced air stream because of the small relative speed difference between the air particles of the air stream and that of the contacted particles of disk 26. Similarly very little heat will be given by the air stream to the hub portion 28 and shaft unit 31, for the same reason. However, whatever heat is transmitted by the air stream and by the vanes 32 to disk 26, it will be effectively dissipated through the cooling effect of the atmosphere in a similar way as it was described in connection with disk 26. Also here the peripheral portion of disk 25 will have the lowest temperature, hence, the heat will flow from the hub portion away from the shaft unit 31 toward the peripheral portion of disk 26. As a result, the shaft unit 31 will show only a negligible increase in temperature, hence, its supporting bearings and other driving parts will be protected effectively from the heat coming from the furnace 10.

Whatever was said as to blocking the heat conducted by shaft units 13 and 21, is true as to the heat possibly radiated from the furnace toward the bearings which are shielded effectively from the radiated heat through the substantial dimensions and mass of the heat dissipating coupling 24, interposed between the bearings and the furnace.

Figure 4 represents the second embodiment of my invention which differs only in that respect from the first embodiment that between shaft units 13 and 21, which both are partially hollow and are provided with a plurality of radial holes, a second heat dissipating coupling 24 is installed instead of the rigid coupling halves 18 and 19 shown in the first embodiment. This second coupling 24 may be constructed from parts of similar or different dimensions than the parts of the first coupling to suit conditions. The heat blocking effect of each of these couplings is a function of the masses and outside diameters of the shaft units and of those of the disks 25 and 26 and also of the thickness, of the width and of the shape of the vanes 32 and of the speed at which they are rotated including the heat conducting characteristics of their materials and also of the atmospheric temperature and of the temperature prevailing within the chamber of the heat treating device. These variables being known in each instance by suitable selection of the materials and proper dimensioning of the parts, which is only a matter of skill, by applying the principles and structure I invented, and disclosed hereby, for every purpose and installation a perfectly suitable heat protected drive or bearing cooling device, as my invention is entitled, can be constructed by those versed in the art.

The second embodiment functions in a similar manner as the first one except that the conducted and radiated heat will be blocked from entering the next shaft unit at two locations instead of at a single one, such as shown in the first embodiment.

Having fully disclosed my invention and illustrated it by two embodiments, it will be understood that various changes and modifications may be made within the scope of my invention, hence I do not wish to be limited by these exemplary embodiments.

I claim:

A bearing cooling device to be interposed between a heated shaft unit and a bearing comprising a pair of shafts at least one of which is hollow and adapted to be fastened to the heated shaft unit in axial alignment, a pair of radially disposed spaced apart discs of relatively large diameters and masses as compared with the shaft unit, impeller vanes connecting the discs, said discs and vanes connecting the pair of shafts at a spaced apart position from the junction of the hollow shaft and heated shaft, lateral openings in the hollow shaft between the junction of said shaft with the heated shaft and the radially disposed discs, and openings connecting the interior of the hollow shaft and the space between the radially disposed discs for drawing air out of the hollow shaft.

WILLIAM L. CLAYTON.

REFERENCES CITED

The following references are of record in the file of this patent:

UNITED STATES PATENTS

| Number | Name | Date |
| --- | --- | --- |
| 13,100 | Pollock | June 19, 1855 |
| 877,102 | Magee | Jan. 21, 1908 |
| 1,578,027 | Harsch | Mar. 23, 1926 |
| 1,953,540 | Ogden | Apr. 3, 1934 |
| 2,226,986 | Wechsberg et al. | Dec. 31, 1940 |
| 2,474,615 | Busquet | June 28, 1949 |